July 2, 1957 J. H. BOOTH 2,797,930
STAMPED METAL BALL JOINT WHEEL SUSPENSION
Filed July 13, 1954 3 Sheets-Sheet 1
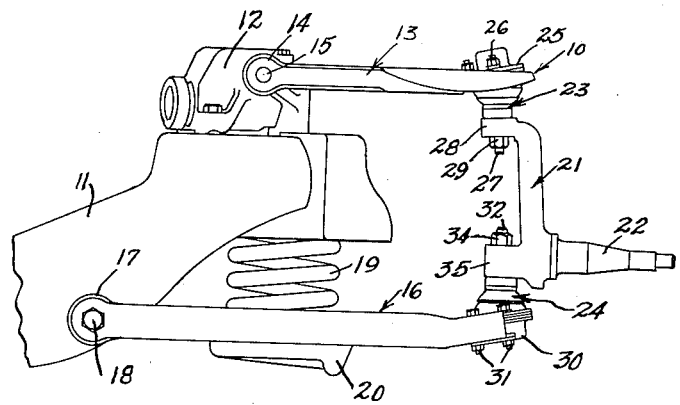
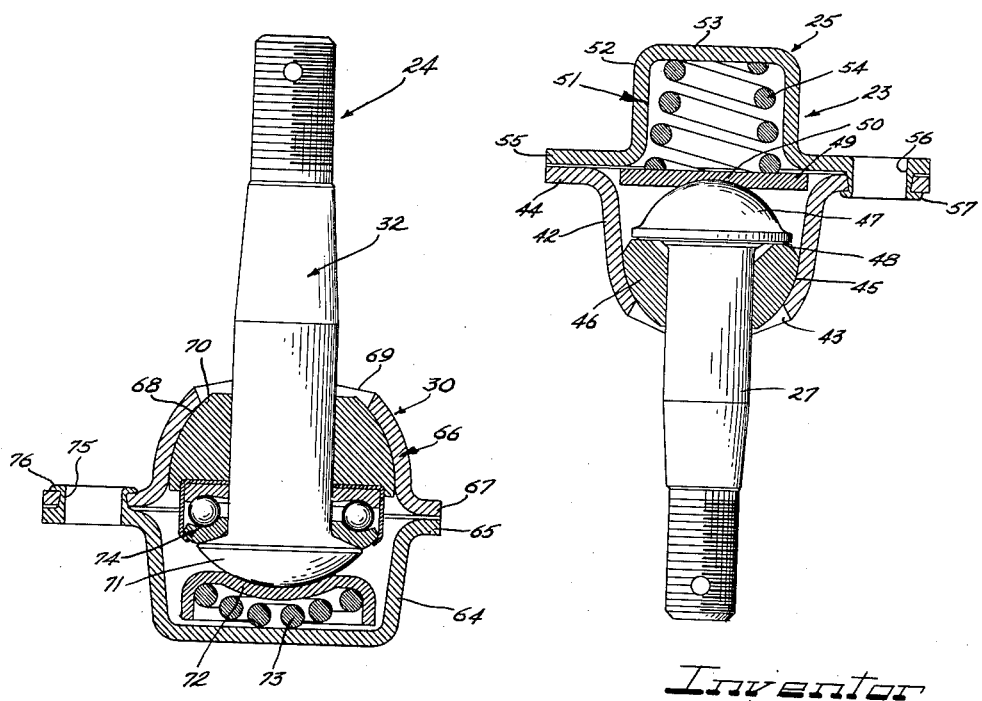
Inventor
JAMES H. BOOTH
by
Attys.

July 2, 1957 J. H. BOOTH 2,797,930
STAMPED METAL BALL JOINT WHEEL SUSPENSION
Filed July 13, 1954 3 Sheets-Sheet 2
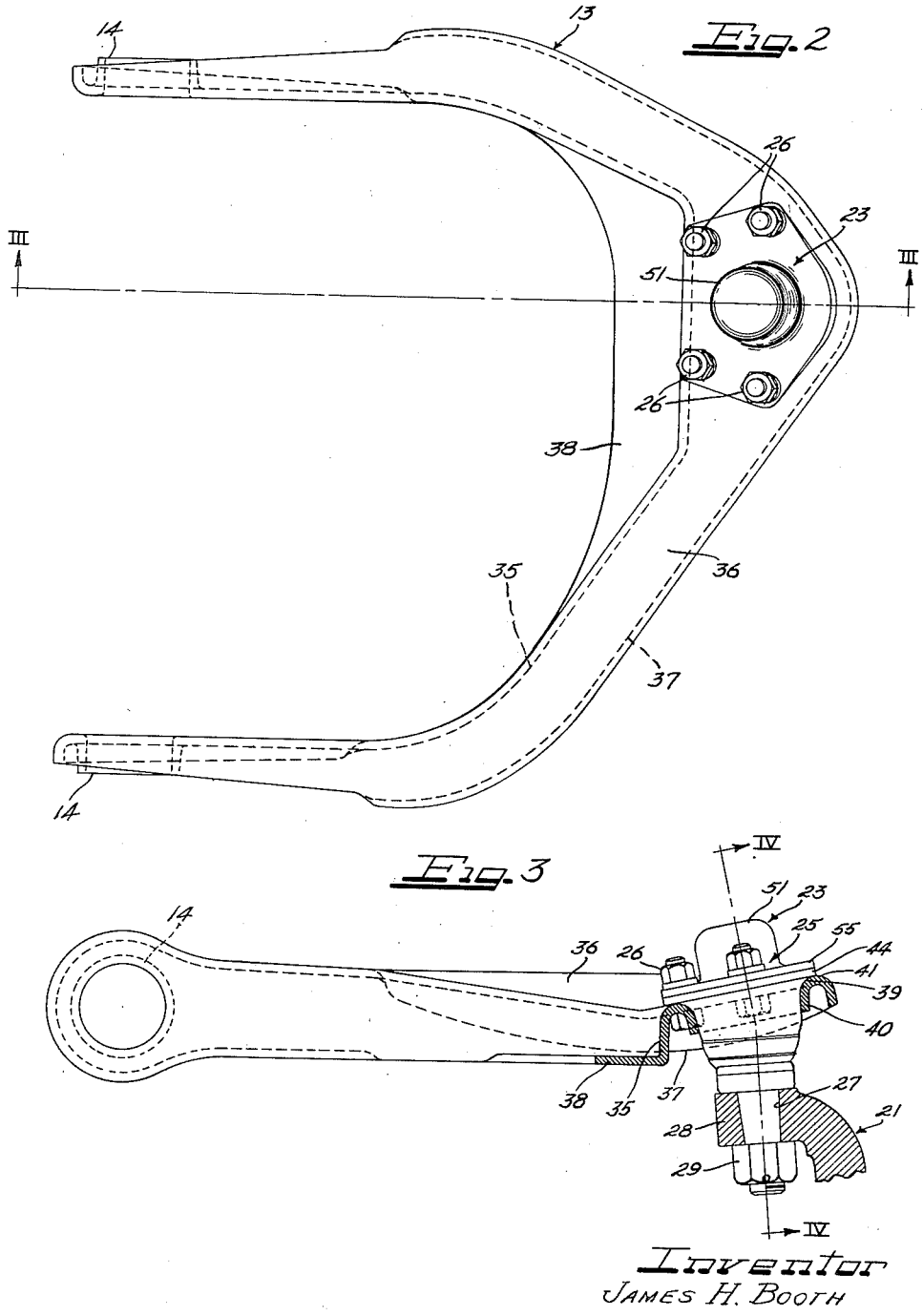
Inventor
JAMES H. BOOTH

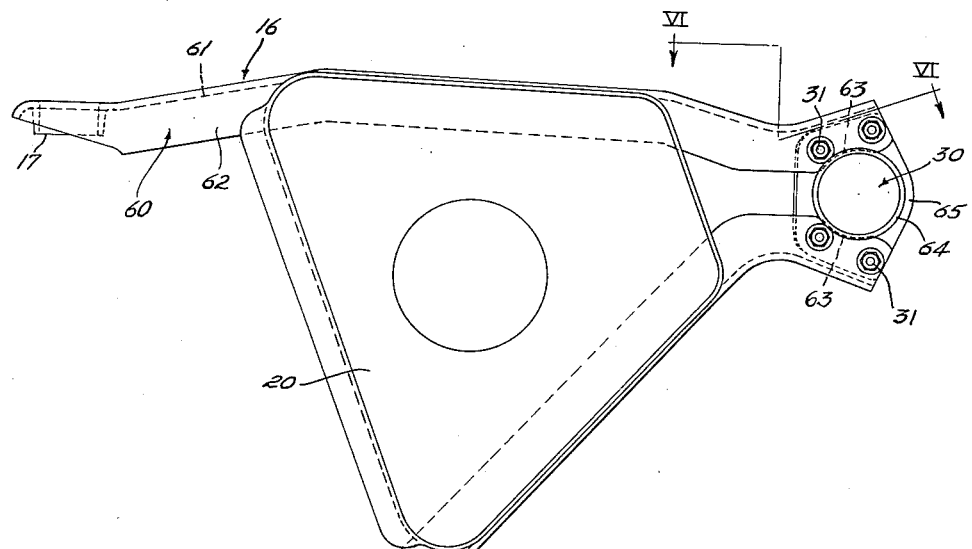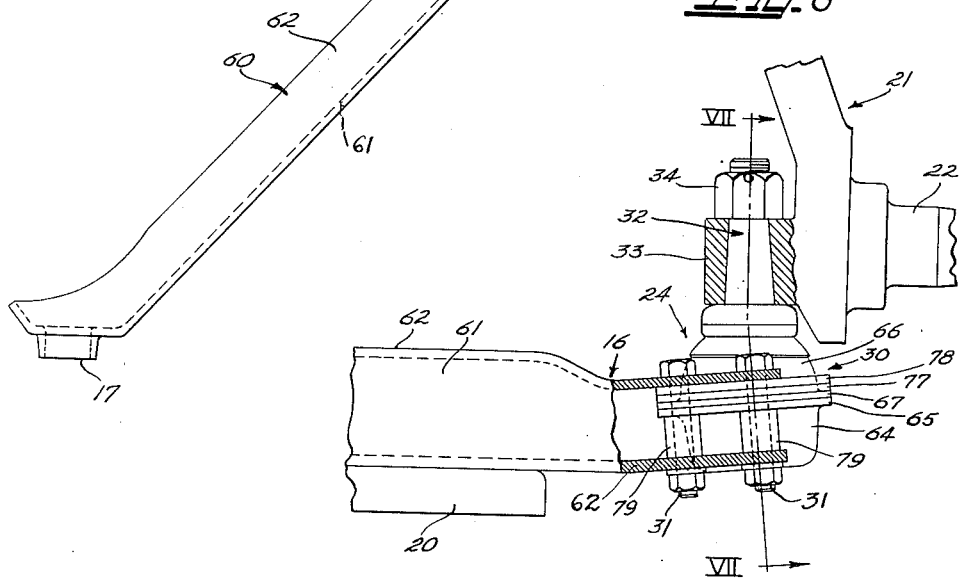

United States Patent Office 2,797,930
Patented July 2, 1957

2,797,930

STAMPED METAL BALL JOINT WHEEL SUSPENSION

James H. Booth, Corunna, Mich., assignor to Thompson Products, Inc., Cleveland, Ohio, a corporation of Ohio Application July 13, 1954, Serial No. 442,981

4 Claims. (Cl. 280—96.2)

This invention relates to ball joint wheel suspensions having stamped sheet metal components to reduce the cost of the suspension. Particularly, this invention relates to socket assemblies for ball joint wheel suspensions which are composed of stamped metal arranged to be reinforced by wheel suspension arms in which they are mounted.

Heretofore, ball joint wheel suspensions for automotive vehicles have required expensive forged parts including sockets or housings for the ball joint components thereof.

The present invention now provides efficient, lightweight, inexpensive stamped metal components for ball joint wheel suspensions. The ball joint socket assemblies of this invention have stamped metal casings or housings which cooperate with stamped metal seats on the ends of the wheel suspension arms to provide an assembly which is just as strong and safe and which has at least as long a wearing life as the heretofore required more expensive forged components.

In accordance with this invention, the outer ends of stamped sheet metal wheel suspension arms are provided with seats surrounding apertures for the sockets of the ball joints. The ball joint sockets, in turn, are composed of mated-together stamped metal casings having flanges overlying the seats of the arms. Fastening bolts simultaneously hold the parts of the casing together and fixedly mount the casing on the arm. The resulting light-weight, inexpensive assembly is just as strong, wear-resistant and efficient as the heretofore required expensive forged components.

It is then an object of this invention to provide a stamped metal ball joint wheel suspension.

A further object of this invention is to provide a ball joint wheel suspension with stamped metal wheel arms having socket seats receiving stamped metal sockets of ball joints and fasteners which simultaneously unite the parts of the sockets together while mounting the sockets on the arms.

Another object of the invention is to provide a sheet metal socket for ball joint wheel suspensions which is reinforced by a sheet metal wheel arm seat on which the socket is mounted.

A still further object of the invention is the provision of ball and socket joints for wheel suspensions wherein the socket is composed of mated-together stamped metal casing halves each equipped with outturned flanges for coaction with the seat on a wheel arm.

A still further and specific object of this invention is to provide a stamped metal ball joint wheel suspension wherein stamped metal joint sockets are mounted on stamped metal seats of the suspension arms in such a manner that the operating loads thereon will be effective to hold the parts together.

Other and further objects of this invention will be apparent to those skilled in the art from the following detailed description of the annexed sheets of drawings which, by way of a preferred example only, illustrate one embodiment of the invention.

On the drawings:

Figure 1 is a fragmentary front elevational view of a stamped sheet metal ball joint wheel suspension for an automotive vehicle.

Figure 2 is a top plan view of the upper wheel suspension arm.

Figure 3 is a cross-sectional view, with parts in side elevation, taken along the line III—III of Figure 2.

Figure 4 is a vertical cross-sectional view, with parts in elevation, taken along the line IV—IV of Figure 3.

Figure 5 is a bottom plan view of the lower wheel suspension arm.

Figure 6 is a cross-sectional view, with parts in elevation, taken along the line VI—VI of Figure 5.

Figure 7 is a vertical cross-sectional view, with parts in elevation, taken along the line VII—VII of Figure 6.

As shown on the drawings:

The ball joint wheel suspension 10 of Figure 1 is illustrated as mounted on a cross-frame member 11 with a shock absorber 12 affixed to the upper surface of the outer end thereof. An upper control arm 13 composed of stamped metal, in accordance with this invention, has pivot bosses 14, 14 pivotally affixed to the shock absorber 12 as at 15.

A lower wheel suspension control arm or load-carrying arm 16, also formed from stamped metal, in accordance with this invention, has pivot bosses 17, 17 (Figure 5), provided thereon for pivot mounting to the cross-frame member 11 below the shock absorber 12 by means of connecting bolts such as 18. A coil spring 19 is disposed between the cross-frame member 11 and the spring pad 20 of the lower control arm 16. The weight of the vehicle is, therefore, transmitted to the lower arm through the coil spring.

A steering knuckle 21 having an outwardly extending integral wheel spindle 22 for rotatably supporting a steerable vehicle road wheel (not shown), is provided between the upper and lower arms and is connected to the upper arm through a ball joint assembly 23 and to the lower arm through a ball joint assembly 24.

The ball joint assembly 23 has a stamped sheet metal socket or housing 25 attached to the upper arm 13 by bolts 26 and a stud 27 projects from the bottom of the housing 25 through the top boss or eye 28 of the knuckle. A nut 29 threaded on the stud draws a tapered portion of the stud into wedge-fitting engagement in the eye or boss 28.

The bottom ball joint assembly has a housing 30 of stamped sheet metal attached by bolts 31 to the bottom arm 16 and a stud 32 projects upwardly from the housing 30 through the lower boss or eye 33 of the wheel knuckle. A nut 34 threaded on the threaded upper end of the stud draws the tapered portion of the stud into tight wedging engagement with the boss 35.

In this manner, the vehicle is suspended from the wheel on the spindle 22 by tension load on the stud 32 while shock load and rebounds are transmitted between the wheel and vehicle body to the shock absorber through compression load on the stud 27 of the top joint 23.

In accordance with this invention, the stamped sheet metal top control arm 13 has a main vertical web portion 35 with an outturned flat flange 36 on the outer end thereof. This flange also has a depending skirt 37 around its outer periphery. At the apex of the arm, an outturned ledge 38 is formed on the bottom of the web 35.

As illustrated in Figure 3, the top wall 36 at the apex, is depressed and apertured at 39 with a tubular skirt or flange 40 surrounding the aperture and a rounded bead-like rim 41 outwardly from the aperture. This bead 41 provides an inclined seat for the ball joint housing 25.

As shown in Figure 4, the ball joint 23 has a stamped sheet metal housing 25 composed of a cup-shaped bottom half portion 42 with an aperture 43 through the bottom thereof through which the stud 27 extends, and an outturned peripheral flange 44 surrounding the open top thereof. The housing 42 has a fragmental spherical internal bearing wall 45 surrounding the aperture 43 in the bottom thereof and a hemispherical bearing member or ball 46 is tiltably mounted on this bearing wall 45. The stud has a rounded dome or ball-like head 47 providing a radial shoulder 48 overlying the ball or bearing member 46 and riding thereon.

A washer or seat 49 has a rounded depression 50 in the center thereof receiving the rounded top 47 of the stud head.

The casing 25 also has a top half 51 with a hat-like cylindrical central portion 52 and a flat top 53 providing a chamber receiving a compression spring 54 acting on the seat 49 to urge the same against the stud head 47. An outturned rim or flange 55 surrounds the cylindrical portion 52 and overlies the flange 44 of the casing part 42. The flanges 44 and 55 have aligned bolt-receiving apertures for the bolts 26.

For purposes of holding the assembly together prior to mounting on the control arm 13, one of the apertures of the flange 55 has a collar 56 depending therefrom through the aligned aperture of the flange 44 and this collar is peened over or riveted against the flange 44 at 57. This provides a temporary attachment for the casing halves and can be substituted with any suitable means such as clamps, separate rivets, or the like.

As shown in Figure 3, the flange 44 of the bottom casing part 42 overlies the rounded bead or rim 41 of the arm 13 while the flange 55 of the top casing part 51 overlies the flange 44. Four apertures are provided through the flange 36 of the arm to be aligned with the apertures in the flanges 44 and 55 and the fastening bolts 26 extend through these apertures and thereby simultaneously clamp the flanges 44 and 55 together while mounting the housing 25 on its seat 41.

This arrangement provides an exceptionally strong reinforced mounting wherein the suspension arm actually cooperates with the joint casing to carry the joint components.

It will be noted from Figure 4 that the washer 49 is very close to the flange 55 and may impact thereagainst during wheel rebound. However, these impacting forces will not tend to separate the casing half 51 from the half 42 because the bolts 26 will preclude such separation. On the other hand, tension loads on the stud will tend to pull the casing half 42 downwardly to move its flange 44 tightly against its seat 41.

The bottom control arm or suspension arm 16 is composed of two channel-shaped members 60 with vertical web portions 61 and inturned horizontal flanges 62 at the top and bottom thereof. The channels 60 converge inwardly to the apex of the arm and their flanges 62 are recessed at 63 (Figure 5) to receive the housing 30 of the lower ball joint therebetween.

As best shown in Figure 7, the housing 30 has a bottom stamped metal cup-shaped casing part 64 with a tapered side wall, a flat bottom, and an outturned peripheral flange 65 around the top thereof. The top casing part 66 has an outturned peripheral flange 67 around the open bottom thereof mating with the flange 65. The top casing part 66 has an upwardly extending fragmental spherical portion providing a bearing wall 68 and defining an open top 69 at the converging end of the bearing wall.

A hemispherical bearing member or ball 70 is tiltably mounted on the bearing wall 68 and receives the stud 32 therethrough in rotatable relation.

The stud has a head 71 on the bottom end thereof with a rounded bottom contour seated in a spring seat 72 which is urged thereagainst by a spring 73 held under compression on the bottom of the casing part 64.

The stud head supports the bottom race ring of a caged ball bearing 74 and the top race ring of the bearing assembly thrusts against the ball member 70. The stud is thereby rotatably supported in the ball member 70 on the anti-friction ball element 74 and is tiltable in the housing 30 on the ball member 70 and bearing wall 68 of the housing. The spring urges the seat 72 to maintain the stud in good bearing engagement with the ball bearings and the tilting bearing member or ball member.

The mating flanges 65 and 67 have a plurality of aligned apertures at spaced intervals therearound which, as illustrated in Figure 5, are at the sides of the joint to register with apertures in the flanges 62 of the wheel arm on each side of the recessed portions 63 thereof. As shown in Figure 7, one of the apertures has an integral collar portion 75 extending through the other aperture and peened thereover as at 76 to hold the casing parts 64 and 66 in assembled relation prior to mounting the control arm 16.

As shown in Figure 6, spacer washers or shims 77 and 78 are disposed around the casing part 66 on top of the flange 67 thereof. The washer 78 directly underlies the top flanges 62 of the channels 61. Spacer tubes or sleeves 79 are disposed around the bolts 31 between the flange 65 of the casing part 64 and the bottom flanges 62 of the channels 61. These tubes 79 coact with the washers 77 and 78 to provide with the flanges 65 and 67 a stacked height equivalent to the space between the top and bottom flanges 62.

The mounting bolts 31 extended through apertures in the flanges 62, the washers 77 and 78, and the flanges 65 and 67, to thereby rigidly mount the housing 30 on the arm 16 while simultaneously forcing the casing halves 64 and 66 together.

Since the stud 32 is under tension because the arm 16 carrying the vehicle load is below the knuckle boss 33, the housing 30 will be pulled tightly against the top flange 62 under the load of the vehicle. At the same time, rebound loads will not be capable of separating the casing halves since the spacer tube 79 will support the bottom casing part from the bottom flange 62. It will be understood, therefore, that the wheel arm coacts with the housing 30 to strengthen and rigidify the joint components.

From the above descriptions it will, therefore, be evident that the invention provides an inexpensive stamped metal ball joint wheel suspension wherein stamped ball joint sockets cooperate with and are received by the bight portions of generally U-shaped stamped wheel suspension arms or control arms to provide a strong wear-resisting assembly.

It will be understood that variations and modifications may be effected without departing from the scope of the novel concepts of this invention.

I claim as my invention:

1. A ball joint wheel suspension comprising a sheet metal control arm having two channel pieces with vertical webs and inturned horizontal flanges, said channel pieces converging toward an apex and said flanges providing a seat at the apex partially surrounding a generally vertically disposed aperture and providing an entrance gap to said aperture at the apex of the arm, a ball joint assembly including a pair of mated together stamped sheet metal casing parts each with laterally extending outturned flanges therearound sized to fit between the vertical webs of the control arm in lapped relation with said seat, one of said casing parts being generally cup-shaped and having an aperture through the bottom of the cup, said cup-shaped casing part fitting through said entrance gap and projecting through said seat, a stud rotatably and tiltably carried in the casing parts and projecting through said aperture of the cup-shaped part, spacers between the flanges of the other casing part and the inturned flanges of the control arm to hold the flange of the cup-shaped casing part against the opposed flange of the control arm, and a plurality of bolts extending through said casing flanges and each of said control arm flanges coacting with said spacers to connect the casing parts together and simultaneously secure the casing to the control arm, said stud in operation being stressed under tension to pull the cup-shaped casing part in the direction toward said aperture to thereby seat the flange thereof tightly against the control arm seat and cooperate with said bolts to hold the assembly together.

2. A ball joint wheel suspension comprising a control arm having a vertically disposed aperture at the outer end thereof partially surrounded by vertically spaced seats and having an entrance gap to said seats, a ball joint assembly having a housing fitting said entrance gap and composed of mated together casing halves with mated laterally extending flanges sized to fit between said seats, one of said casing halves being generally cup-shaped and adapted to project through said aperture, a stud projecting from said cup-shaped casing part in tiltable and rotatable relation with the housing, spacers between one of said seats and the flange of the adjacent casing half, and bolt assemblies projecting through both of said seats, said flanges and said spacers for clamping the flanges relative to the seats, said stud in operation being under tension to pull the cup-shaped casing half toward said aperture to thereby seat the flange thereof against said control arm seat and cooperate with the bolts and spacers to hold the casing parts together and to the control arm.

3. In a ball joint wheel suspension which comprises a stamped sheet metal control arm having a vertically disposed aperture at the outer end thereof at least partially surrounded by a seat, a ball joint assembly composed of stamped sheet metal housing halves with mated laterally extending flanges in lapped relation with said control arm seat, one of said housing halves projecting through said aperture of the control arm, a stud rotatably and tiltably mounted in the housing of the joint and extending from said housing half projected through said aperture, a plurality of bolts simultaneously uniting the flanges of the housing halves to each other and to said control arm seat, and said stud in operation being under tension to pull the housing into seated relation with the control arm seat and thereby coact with said bolts in holding the housing against the seat.

4. A ball joint wheel suspension which comprises a generally U-shaped stamped sheet metal control arm having a joint housing seat at its bight portion surrounding a substantially vertically disposed aperture at least around a portion of said aperture, a ball joint assembly including a pair of mated together stamped sheet metal casing parts each with laterally extending outturned flanges therearound, one of said casing parts being generally cup-shaped and having an aperture through the bottom of the cup, a bearing ring tiltable in said cup-shaped casing part, a stud rotatably carried by said bearing ring and projecting through the aperture of said cup-shaped casing part, a spring urging said stud against said bearing ring held under compression by the other casing part, said control arm seat and said flanges having registering bolt holes therethrough, bolt assemblies compression loaded to hold the casing parts together and to the seat, and said stud in operation being stressed under tension to pull the cup-shaped casing part in a direction toward the aperture to thereby seat the flange thereof tightly against the control arm seat and cooperate with said bolts to hold the assembly together.

References Cited in the file of this patent

UNITED STATES PATENTS

| 1,332,760 | Saitta | Mar. 2, 1920 |
| 1,444,628 | Miller | Feb. 6, 1923 |
| 1,612,047 | Owens | Dec. 28, 1926 |
| 2,162,360 | Shaeffer | June 13, 1939 |
| 2,167,984 | Leighton | Aug. 1, 1939 |
| 2,521,335 | Booth | Sept. 5, 1950 |
| 2,556,767 | McCann | June 12, 1951 |
| 2,611,625 | Kishline et al. | Sept. 23, 1952 |